United States Patent
Shazeer et al.

(10) Patent No.: US 11,494,561 B2
(45) Date of Patent: *Nov. 8, 2022

(54) MULTI-TASK MULTI-MODAL MACHINE LEARNING SYSTEM

(71) Applicant: Google LLC, Mountain View, CA (US)

(72) Inventors: Noam M. Shazeer, Palo Alto, CA (US); Aidan Nicholas Gomez, Toronto (CA); Lukasz Mieczyslaw Kaiser, Mountain View, CA (US); Jakob D. Uszkoreit, Portola Valley, CA (US); Llion Owen Jones, San Francisco, CA (US); Niki J. Parmar, Sunnyvale, CA (US); Ashish Teku Vaswani, San Francisco, CA (US)

(73) Assignee: Google LLC, Mountain View, CA (US)

(*) Notice: Subject to any disclaimer, the term of this patent is extended or adjusted under 35 U.S.C. 154(b) by 61 days.

This patent is subject to a terminal disclaimer.

(21) Appl. No.: 16/984,337

(22) Filed: Aug. 4, 2020

(65) Prior Publication Data

US 2020/0364405 A1 Nov. 19, 2020

Related U.S. Application Data

(63) Continuation of application No. 16/689,025, filed on Nov. 19, 2019, now Pat. No. 10,789,427, which is a
(Continued)

(51) Int. Cl.
*G06F 40/284* (2020.01)
*G06K 9/62* (2022.01)
(Continued)

(52) U.S. Cl.
CPC ......... *G06F 40/284* (2020.01); *G06K 9/6227* (2013.01); *G06K 9/6298* (2013.01); *G06N 3/0454* (2013.01); *G06N 3/08* (2013.01)

(58) Field of Classification Search
USPC .............................................. 704/7–10, 257
See application file for complete search history.

(56) References Cited

U.S. PATENT DOCUMENTS

| 6,125,105 | A | 9/2000 | Edwards |
| 7,660,774 | B2 * | 2/2010 | Mukherjee ........... G06N 3/0454 |
| | | | 706/20 |

(Continued)

FOREIGN PATENT DOCUMENTS

| CN | 105868829 A | 8/2016 |
| CN | 106462802 A | 2/2017 |

(Continued)

OTHER PUBLICATIONS

EP Office Action in European Application No. 18737050.7, dated Nov. 17, 2021, 8 pages.
(Continued)

*Primary Examiner* — Leonard Saint Cyr
(74) *Attorney, Agent, or Firm* — Fish & Richardson P.C.

(57) ABSTRACT

Methods, systems, and apparatus, including computer programs encoded on computer storage media for training a machine learning model to perform multiple machine learning tasks from multiple machine learning domains. One system includes a machine learning model that includes multiple input modality neural networks corresponding to respective different modalities and being configured to map received data inputs of the corresponding modality to mapped data inputs from a unified representation space; an encoder neural network configured to process mapped data inputs from the unified representation space to generate respective encoder data outputs; a decoder neural network configured to process encoder data outputs to generate respective decoder data outputs from the unified representation space; and multiple output modality neural networks
(Continued)

corresponding to respective different modalities and being configured to map decoder data outputs to data outputs of the corresponding modality.

20 Claims, 6 Drawing Sheets

Related U.S. Application Data continuation of application No. PCT/US2018/033734, filed on May 21, 2018.

(60) Provisional application No. 62/509,016, filed on May 19, 2017.

(51) Int. Cl.
*G06N 3/04* (2006.01)
*G06N 3/08* (2006.01)

(56) References Cited

U.S. PATENT DOCUMENTS

| | | | |
|---|---|---|---|
| 9,922,272 B2 * | 3/2018 | Cheng | G06K 9/6289 |
| 10,515,625 B1 * | 12/2019 | Metallinou | G06F 3/167 |
| 2017/0293736 A1 | 10/2017 | Kramer | |
| 2017/0330068 A1 | 11/2017 | Yu | |
| 2018/0096241 A1 * | 4/2018 | Healey | G06N 3/105 |

FOREIGN PATENT DOCUMENTS

| | | |
|---|---|---|
| CN | 106471526 A | 3/2017 |
| EP | 3054403 | 8/2016 |
| WO | WO 2016065327 | 4/2016 |

OTHER PUBLICATIONS

Ba et al., "Layer normalization," https://arxiv.org/abs/1607.06450, Jul. 2016, 14 pages.
Bahdanau et al., "Neural Machine Translation by Jointly Learning to Align and Translate," https://arxiv.org/abs/1409.0473, 2015, 15 pages.
Cho et al., "Learning Phrase Representations using RNN Encoder-Decoder for Statistical Machine Translation," https://arxiv.org/abs/1406.1078, last revised Sep. 2014, 15 pages.
Chollet, "Xception: Deep Learning with Depthwise Separable Convolutions," https://arxiv.org/abs/1610.02357, Apr. 2017, 8 pages.
Collobert et al., "A Unified Architecture for Natural Language Processing: Deep Neural Networks with Multitask Learning," Proceedings of the 25th International Conference on Machine learning, Jul. 2008, 160-167.
Dahl et al., "Context-Dependent Pre-Trained Deep Neural Networks for Large-Vocabulary Speech Recognition," IEEE Transactions on Audio, Speech and Language Processing, Jan. 2012, 20(1):30-42.
Feng et al., "Correspondence Autoencoders for Cross-Modal Retrieval", ACM Transactions on Multimedia Computing, Communications, and Applications (TOMM), Oct. 2015, 12(1s):26:1-22.
Hochreiter et al., "Long Short-Term Memory," Neural Computation, Nov. 1997, 9(8):1735-1780.
Johnson et al., "Google's Multilingual Neural Machine Translation System: Enabling Zero-Shot Translation," Transactions of the Association for Computational Linguistics , 2017, 5:339-351.
Kaiser et al., "Can Active Memory Replace Attention?," https://arxiv.org/abs/1610.08613, Oct. 2016, 9 pages.
Kaiser et al., "Depthwise Separable Convolutions for Neural Machine Translation," https://arxiv.org/abs/1706.03059, Jun. 2017, 10 pages.
Kalchbrenner et al., "Neural Machine Translation in Linear Time," https://arxiv.org/abs/1610.10099, last revised Mar. 2017, 9 pages.
Kalchbrenner et al., "Recurrent Continuous Translation Models," Proceedings of the 2013 Conference on Empirical Methods in Natural Language Processing, Oct. 2013, 1700-1709.
Kingma et al., "Adam: A Method for Stochastic Optimization," https://arxiv.org/abs/1412.6980, Dec. 2014, 15 pages.
Krizhevsky et al., "ImageNet Classification with Deep Convolutional Neural Networks," Advances in Neural Information Processing Systems, 2012, 9 pages.
Lin et al., "Microsoft COCO: Common Objects in Context," http://arxiv.org/abs/1405.0312, May 2014, 15 pages.
Meng et al., "Encoding Source Language with Convolutional Neural Network for Machine Translation," https://arxiv.org/abs/1503.01838, Mar. 2015, 12 pages.
Ngiam et al., "Multimodal Deep Learning," Proceedings of the 28th international conference on machine learning, Jun.-Jul. 2011, 8 pages.
PCT International Preliminary Report on Patentability in International Appln. No. PCT/US2018/033734, dated Nov. 19, 2019, 8 pages.
PCT International Search Report and Written Opinion of the International Appln. No. PCT/US2018/033734, dated Sep. 26, 2018, 9 pages.
Peng et al., "Cross-Media Shared Representation by Hierarchical Learning with Multiple Deep Networks," Proceedings of the 25th International Joint Conference on Artificial Intelligence (IJCAI'16), Jul. 2016, 3846-3853.
Romera-Paredes et al., "Exploiting Unrelated Tasks in Multi-Task Learning," International conference on artificial intelligence and statistics, Apr. 2012, 951-959.
Russakovsky et al., "ImageNet Large Scale Visual Recognition Challenge," International Journal of Computer Vision (IJCV), Apr. 2015, 115(3):42 pages.
Seltzer et al., "Multi-task learning in deep neural networks for improved phoneme recognition," 2013 IEEE International Conference on Acoustics, Speech and Signal Processing, May 2013, 6965-6969.
Sennrich et al., "Neural Machine Translation of Rare Words with Subword Units," https://arxiv.org/abs/1508.07909, Aug. 2015, 11 pages.
Shazeer et al., "Outrageously Large Neural Networks: The Sparsely-Gated Mixture-of-Experts Layer," https://arxiv.org/abs/1701.06538, Jan. 2017, 19 pages.
Sifre et al., "Rotation, Scaling and Deformation Invariant Scattering for Texture Discrimination," Proceedings of the 2013 IEEE Conference on Computer Vision and Pattern Recognition, Jun. 2013, 1233-1240.
Sutskever et al., "Sequence to Sequence Learning with Neural Networks," https://arxiv.org/abs/1409.3215, Sep. 2014, 9 pages.
Szegedy et al., "Inception-v4, Inception-ResNet and the Impact of Residual Connections on Learning," https://arxiv.org/abs/1602.07261, last revised Aug. 2016, 12 pages.
van den Oord et al., "Wavenet: A Generative Model for Raw Audio," https://arxiv.org/abs/1609.03499, Sep. 2016, 15 pages.
Vaswani et al., "Attention Is All You Need," https://arxiv.org/abs/1706.03762, Jun. 2017, 11 pages.
Yu et al., "Multi-Scale Context Aggregation by Dilated Convolutions," https://arxiv.org/abs/1511.07122, Nov. 2015, 13 pages.
Zhang et al., "Facial Landmark Detection by Deep Multi-task Learning," European conference on computer vision, Sep. 2014, 15 pages.
CN Office Action in Chinese Appln. No. 201880028587.3, dated Aug. 25, 2022, 19 pages (with English Translation).

* cited by examiner

MULTI-TASK MULTI-MODAL MACHINE LEARNING SYSTEM

CROSS-REFERENCE TO RELATED APPLICATIONS

This application is a continuation of and claims priority to U.S. patent application Ser. No. 16/689,025, filed on Nov. 19, 2019, which is a continuation of and claims priority to PCT Application No. PCT/US2018/033734, filed on May 21, 2018, which claims priority to U.S. Provisional Application No. 62/509,016, filed on May 19, 2017. The disclosures of the prior applications are considered part of and are incorporated by reference in the disclosure of this application.

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters. Neural networks may be trained on machine learning tasks using training data to determine trained values of the layer parameters and may be used to perform machine learning tasks on neural network inputs.

SUMMARY

This specification describes methods and systems, including computer programs encoded on computer storage media, for training a single machine learning model to perform multiple machine learning tasks from different machine learning domains. Example machine learning domains include image recognition, speech recognition, machine translation, image captioning, or parsing.

In general, one innovative aspect of the subject matter described in this specification can be embodied in a system comprising one or more computers and one or more storage devices storing instructions that when executed by the one or more computers cause the one or more computers to implement a machine learning model that comprises: a plurality of input modality neural networks, wherein each input modality neural network corresponds to a different modality of multiple modalities and is configured to map received data inputs of the corresponding modality to mapped data inputs from a unified representation space; an encoder neural network that is configured to process mapped data inputs from the unified representation space to generate respective encoder data outputs; a decoder neural network that is configured to process encoder data outputs to generate respective decoder data outputs from the unified representation space; and a plurality of multiple output modality neural networks, wherein each output modality neural network corresponds to a different modality and is configured to map decoder data outputs from the unified representation space that correspond to received data inputs of the corresponding modality to data outputs of the corresponding modality.

Other embodiments of this aspect include corresponding methods, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the multiple modalities comprise one or more of (i) image recognition, (ii) speech recognition, (iii) translation, (iv) image captioning, or (v) parsing.

In some implementations the received data inputs comprise data inputs from different modalities and with different sizes and dimensions, and wherein mapped data inputs from the unified representation space vary in size.

In some implementations the plurality of input modality networks comprise neural networks corresponding to different modalities, and wherein the plurality of output modality networks comprise neural networks corresponding to different modalities.

In some implementations the plurality of input modality networks and plurality of output modality networks modalities comprise (i) language modality networks, (ii) image modality networks, (iii) audio modality networks, and (iv) categorical data modality networks.

In some implementations a language input modality network is configured to: receive as input a sequence of tokens from a token vocabulary, optionally wherein the received sequence of tokens ends with a termination token; and map the sequence of tokens to a predetermined dimensionality, the predetermined dimensionality dependent on a dimension of the encoder and decoder neural networks.

In some implementations a language output modality network is configured to: receive as input a decoder output from the decoder neural network; perform a learned linear mapping followed by a softmax activation function to generate a probability distribution over the token vocabulary.

In some implementations an image input modality network is configured to deepen a received input image feature depth using one or more residual convolutional layers.

In some implementations a categorical output modality network is configured to reshape a one-dimensional decoder neural network output into a two-dimensional output and perform progressive down sampling on the two-dimensional output.

In some implementations the decoder neural network is an autoregressive decoder neural network.

In some implementations the encoder neural network and decoder neural network comprise neural network components from multiple machine learning domains, comprising (i) one or more convolutional neural network layers, (ii) one or more attention neural network layers configured to perform respective attention mechanisms, (iii) one or more sparsely gated neural network layers.

In some implementations each convolutional neural network layer is configured to receive as input a tensor of shape [batch size, sequence length, 1, feature channels] and to return a tensor of the same shape.

In some implementations each convolutional neural network layer comprises rectified linear unit non-linearities and layer normalization.

In some implementations the one or more convolutional neural network layers are configured to perform convolutional operations, comprising performing depthwise separable convolutions.

In some implementations a convolutional operation is defined as ConvStep$_{d,s}$(W,x)=LN (StepConv$_{d,s}$(W,ReLU (x))) where W represents convolutional layer weights, x represents convolutional layer input tensor, LN represents convolutional layer normalization and ReLU represents rectified linear unit non linearities.

In some implementations the one or more convolutional neural network layers comprise a stack of four convolutional layers with two skip connections between the stack input and outputs of the second and fourth convolutional layers.

In some implementations each attention neural network layer comprises one or more convolutional neural network layers that include one or more pointwise convolutional neural network layers.

In some implementations each attention neural network layer is configured to receive as input (i) a source input tensor, and (ii) a target input tensor, the source input tensor and target input tensor having the shape [sequence length, feature channels].

In some implementations each attention neural network layer is configured to: additively compose the target tensor with a timing signal and mix the target tensor using one or more of the convolutional layers to generate a mixed tensor; self-attend the mixed tensor to generate query keys; generate memory keys and memory values by passing the source tensor through one or more pointwise convolutional layers; and use the generated query keys, memory keys and memory values to apply an attention mechanism between the self-attended target input tensor and the source input tensor.

Another innovative aspect of the subject matter described in this specification can be embodied in a method comprising: receiving a request to perform a machine learning task on an input of a first modality, wherein the machine learning task comprises a machine learning task from a particular machine learning domain that transforms inputs of the first modality to outputs of a second modality; selecting an input modality neural network that corresponds to the first modality from a plurality of input modality neural networks, wherein the selected input modality neural network is configured to map data inputs of the first modality to mapped data inputs of a unified representation space; processing the input of the first modality using the selected input modality neural network to generate a mapped input of the unified representation space; processing the mapped input of the unified representation space an encoder neural network and a decoder neural network to generate a decoder output, the decoder output representing a representation of an output of the machine learning task in the unified representation space; selecting an output modality neural network that corresponds to a second modality from a plurality of output modality neural networks, wherein the selected output modality neural network is configured to map decoder outputs of the unified representation space to mapped data outputs of the second modality; and processing the decoder output using the selected output modality neural network to generate data representing an output of the second modality of the machine learning task.

The subject matter described in this specification can be implemented in particular embodiments so as to realize one or more of the following advantages.

A multi task multi modal machine learning model, as described in this specification, is a single machine learning model that can achieve high levels of performance on multiple machine learning tasks spanning multiple machine learning domains. The model can be trained to perform the multiple machine learning tasks jointly, thus simplifying and improving the efficiency of the training process. In addition, by training the model jointly, in some cases less training data may be required to train the model (to achieve the same performance) compared to when separate training processes are performed for separate machine learning tasks.

A multi task multi modal machine learning model, as described in this specification, applies mixture of experts neural network layers to tasks other than language processing tasks to improve the performance of the multi task multi modal machine learning model.

A multi task multi modal machine learning model, as described in this specification, combines different mechanisms from different machine learning domains, e.g., depth wise separable convolutions, attention mechanisms and sparsely gated mixture of experts layers, to enhance the performance of the multi task multi modal machine learning model. Indeed, the presence in the multi task multi modal machine learning model of mechanisms from particular domains can be found, in some cases, to improve performance of the model when performing tasks in different domains, particularly when the tasks in the different domains have limited quantities of training data available. For example, whilst attention mechanisms are typically important for language related machine learning tasks, by incorporating attention mechanisms into the multi task multi modal machine learning model, the model can achieve improved performance when performing other machine learning tasks such as image classification. Similarly, incorporation into the model of one or more convolution layers (which are normally associated with the image domain) can improve performance of the model on tasks in the language domain.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a multi model neural network architecture including a single deep learning model that can simultaneously learn different machine learning tasks from different machine learning domains. The deep learning model includes multiple input modality neural networks, an encoder neural network, a decoder neural network, and multiple output modality neural networks. The encoder and decoder neural networks can be constructed using (1) convolutions to allow the model to detect local patterns and generalize across space, (2) attention layers to allow the model to focus on specific elements to improve performance of the model, and (3) a sparsely-gated mixture-of-experts layer to provide the model with capacity without excessive computation cost.

Figure 1:
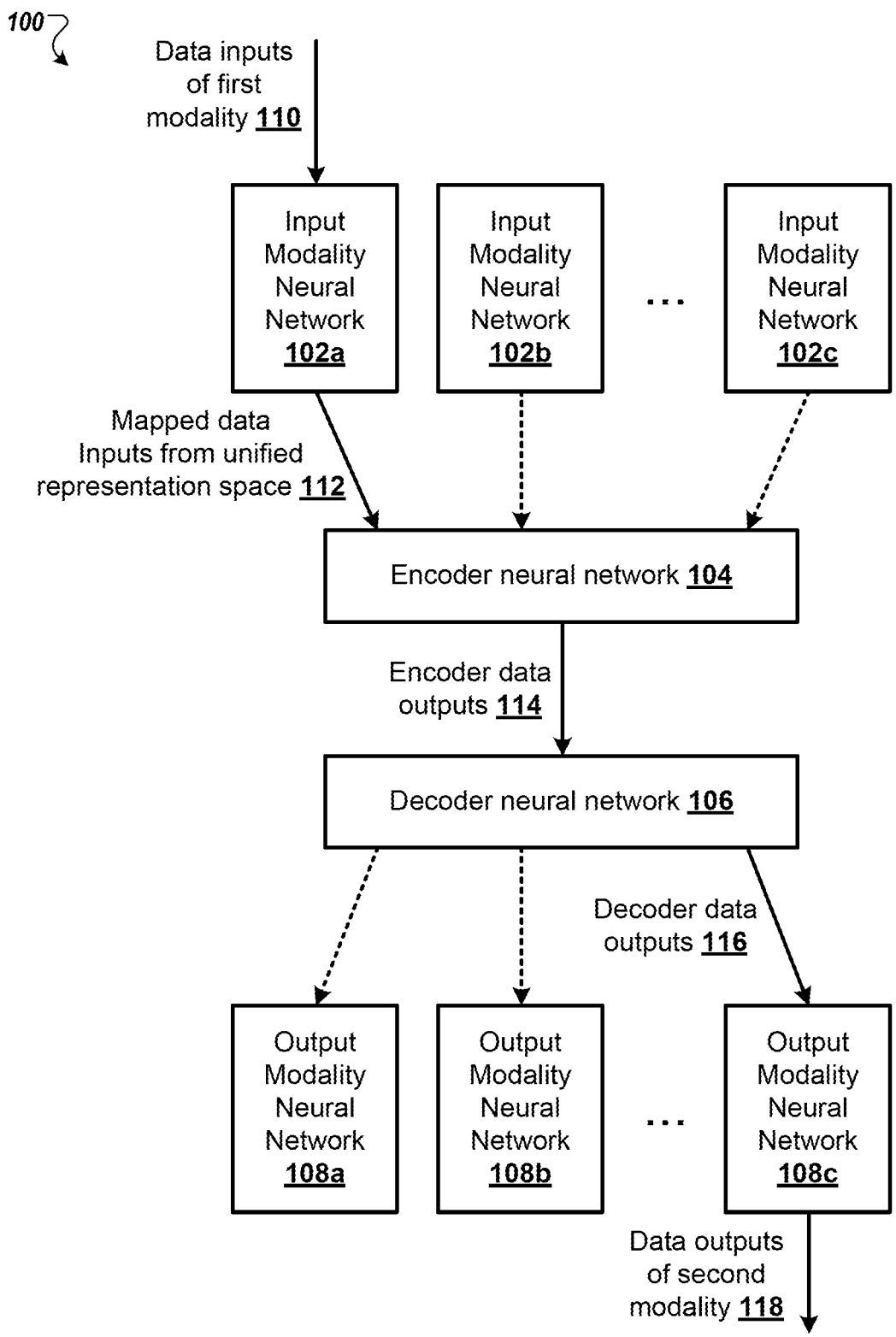
FIG. 1 is a block diagram of an example multi task multi modal machine learning model.

FIG. 1 is a block diagram of an example multi task multi modal machine learning model 100 that performs multiple machine learning tasks from different machine learning domains. The machine learning model 100 is an example of a system implemented as computer programs on one or more computers in one or more locations, in which the systems, components, and techniques described below, can be implemented.

The multi task multi modal machine learning model 100 is configured to receive as input machine learning model data inputs of different machine learning domains/modalities corresponding to different machine learning tasks. Example machine learning domains/modalities include speech, images, language, or text. Example machine learning tasks include speech recognition, image classification, machine translation, or parsing. For example, the multi task multi modal machine learning model 100 may receive text inputs corresponding to a machine translation task, e.g., an input text segment in an input natural language to be translated into a target natural language, or text inputs corresponding to a parsing task, e.g., an input text segment to be parsed.

Data inputs provided to the multi task multi modal machine learning model 100 may include a command-token indicating the machine learning domain and specific machine learning task, such as "To-English" or "To-Parse-Tree," to enable the multi modal machine learning model 100 to produce corresponding outputs for different machine learning tasks (even with the same domain/modality), e.g., corresponding outputs in different target languages for different machine translation tasks.

Data inputs can be received during training or when performing machine learning tasks, i.e., the data inputs may represent training examples or inferential data inputs. For example, the multi modal machine learning model 100 may receive data inputs from a set of training data during training, or may receive data inputs from a user device during an inferential machine learning process.

The multi task multi modal machine learning model 100 includes multiple input modality neural networks 102a-102c, an encoder neural network 104, a decoder neural network 106, and multiple output modality neural networks 108a-108c. Data inputs, e.g., data input 110, received by the multi task multi modal machine learning model 100 are provided to the multiple input modality neural networks 102a-102c and processed by an input modality neural network corresponding to the modality (domain) of the data input. For example, a speech input may be processed by an input modality neural network configured to perform speech recognition whereas a text input may be processed by an input modality neural network configured to perform machine translation. The input modality neural networks 102a-102c are configured to process received data inputs and to generate as output mapped data inputs from a unified representation space, e.g., mapped data 112. Mapped data inputs from the unified representation space are received and processed by the encoder neural network 104. Encoded data output from the encoder neural network 104, e.g., encoder data output 114, are provided to the decoder neural network 106. Decoded data outputs, e.g., decoded data outputs 116 are provided to the multiple output modality neural networks 108a-108c and processed by an output modality neural network corresponding to the modality (domain) of the original data input. The output modality neural networks generate as output data of a second modality. For example, a decoder data output corresponding to an original speech input may be processed by an output modality neural network configured to generate a text output, where the text output represents the speech input.

For convenience, the example multi task multi modal machine learning model 100 is shown as including three input modality networks and three output modality neural networks. However, in some implementations the number of input or output modality neural networks may be less or more, in addition the number of input modality neural networks may not equal the number of output modality neural networks.

Each input modality neural network of the multiple input modality networks 102a-c is configured to map received machine learning model data inputs of one of multiple machine learning domains or modalities to mapped data inputs of a unified representation space. That is, each input modality neural network is specific to a respective modality (and not necessarily a respective machine learning task) and defines transformations between the modality and the unified representation. For example, input modality neural network 102a may be configured to map received machine learning model data inputs of a first modality, e.g., data inputs 110, to mapped data inputs of the unified representation space. Mapped data inputs of the unified representation space can vary in size.

In some cases each modality is associated with one input modality network. That is, the model 100 may not include an input modality network corresponding to each machine learning task, but includes an input modality network corresponding to each modality or domain. For example, all machine translation tasks may share a same input/output modality neural network, no matter for which language pair. This design encourages generalization across machine learning tasks and allows for the addition of new tasks without interrupting the model 100 as it runs.

Received machine learning model data inputs may include data inputs from different modalities with different sizes and dimensions. For example, data inputs may include representations of images, audio or sound waves. Similarly, each output modality neural network of the multiple output modality networks 108a-c is configured to map data outputs of the unified representation space received from the decoder neural network, e.g., decoder data output 116, to mapped data outputs of one of the multiple modalities. That is, each output modality neural network is specific to a respective modality and defines transformations between the unified representation and the modality. For example, output modality neural network 108c may be configured to map decoder data output 116 to mapped data outputs of a second modality, e.g., data output 118.

As described above with reference to the input modality neural networks, in cases where the machine learning model is trained to perform multiple machine learning tasks from two modalities—multiple machine translation tasks and different image recognition tasks—the multiple output modality networks may include two output modality neural networks—a translation output modality network and an image recognition output modality network. That is, the model 100 may not include an output modality network corresponding to each machine learning task, but includes an input modality network corresponding to each modality or domain. Example input modality neural networks and output modality neural networks are described below.

The encoder neural network 104 is a neural network that is configured to process mapped data inputs from the unified representation space, e.g., mapped data input 112, to generate respective encoder data outputs in the unified representation space, e.g., encoder data output 114. Encoder data outputs are in the unified representation space. An example encoder neural network is illustrated and described in more detail below with reference to FIG. 3.

The decoder neural network 106 is a neural network, e.g., an autoregressive neural network, that is configured to process encoder data outputs from the unified representation space, e.g., encoder data output 114, to generate respective decoder data outputs from an output space, e.g., decoder data output 116. An example decoder neural network is illustrated and described in more detail below with reference to FIG. 5.

The encoder neural network 104 and decoder neural network 106 may include neural network components from multiple machine learning domains. For example, the encoder neural network 104 and decoder neural network 106 may include (i) one or more convolutional neural network layers, e.g., a stack of multiple convolutional layers with various types of connections between the layers, (ii) one or more attention neural network layers configured to perform respective attention mechanisms, (iii) one or more sparsely gated neural network layers.

In cases where the encoder neural network 104 or decoder neural network 106 include convolutional neural network layers, the encoder neural network 104 and decoder neural network 106 may include convolutional modules of convolutional neural network layers that are configured to receive as input a tensor of shape [batch size, sequence length, 1, feature channels] and to return a tensor of the same shape. In some cases the convolutional neural network layers may include rectified linear unit non-linearities and layer normalization. In some cases the convolutional neural network layers may be configured to perform different convolutional operations, e.g., depth wise separable convolutions. Depth wise separable convolutional neural network layers are described in "*Xception: Deep learning with depthwise separable convolutions,*" Francois Chollet, arXiv preprint arXiv: 1610.02357, the contents of which are incorporated by reference in the disclosure of this application.

An example convolutional operation that includes a rectified linear unit activation of the inputs, followed by a depth wise separable convolution SepConv, followed by layer normalization that acts over the h hidden units of the layer below, may be defined as $$\text{ConvStep}_{d,s}(W,x) = \text{LN}(\text{SepConv}_{d,s}(W,\text{ReLU}(x))) \quad (1)$$

where $\text{ConvStep}_{d,s}(W,x)$ represents a depthwise separable convolution with layer weights W corresponding to f kernels of size h×w applied to an input tensor x with stride s and dilated by a factor d, LN represents convolutional layer normalization and ReLU represents rectified linear unit non linearities. An example convolutional module is described in more detail below with reference to FIG. 2.

In cases where the encoder neural network 104 or decoder neural network 106 include attention neural network layers, the encoder neural network 104 or decoder neural network 106 may include one or more convolutional neural network layers that include one or more pointwise convolutional neural network layers. An attention neural network layer may be a neural network layer that is configured to receive as input (i) a source input tensor, and (ii) a target input tensor, the source input tensor and target input tensor having the shape [sequence length, feature channels]. The target tensor may be additively composed with a timing signal and mixed using two convolutional modules to generate a mixed tensor. The timing signal enables the content based attention to focus on position, and are constructed by concatenating sine and cosine curves:

$$\Delta(2d) = 1e4^{-2d/depth}$$

$$\text{timing}(t,[2d,2d+1]) = [\sin(t\Delta(2d))\|_2 \cos(t\Delta(2d))] \quad (2)$$

where $[a\|_d b]$ represents concatenation of a and b along the d-th dimension.

The mixed tensor may then be self-attended using a multi head dot product attention (a dot product attention with inputs split into multiple separate tensors representing each attention head). The source tensor may then be passed through two different pointwise convolutions to generate query keys, memory keys and memory values. The generated query keys, memory keys and memory values may then be used to apply an attention mechanism between the self-attended target input tensor and the source input tensor.

In some implementations the multi task multi modal machine learning model 100 may further include an input output mixer neural network. The input output mixer neural network may be configured to process encoded inputs, e.g., received from the encoder neural network 104, and decoder outputs, e.g., received from the decoder neural network 106. The input output mixer neural network may further be configured to generate encoded outputs which may be received and processed by the decoder neural network 106. The input output mixer neural network may include one or more attention neural network layers configured to perform respective attention mechanisms, and one or more convolutional neural network layers. An example input output mixer neural network is illustrated and described in more detail below with reference to FIG. 4.

In some implementations the multiple input modality neural networks 102*a-c* and multiple output modality neural networks 108*a-c* may include language modality neural networks.

A language input modality network is a neural network that is configured to receive as input a sequence of tokens from a token vocabulary, e.g., where the sequence of tokens ends with a termination token, and map the sequence of tokens to a predetermined dimensionality. In some cases mapping the sequence of tokens to a predetermined dimensionality may include performing a learned embedding look-up. The predetermined dimensionality may be dependent on a dimension of the encoder and decoder neural networks.

A language output modality network is a neural network that is configured to receive as input a decoder output from the decoder neural network and perform a learned linear mapping followed by a softmax activation function to generate a probability distribution over the token vocabulary. The action of a language input modality neural network and a language output modality neural network may be summarized as $$\text{LanguageModality}_{input}(x, W_E) = W_E x$$

$$\text{LangUageMOdality}_{output}(y, W_S) = \text{Softmax}(W_S y)$$

where $W_E$, $W_S$ represent neural network weights, x represents the model input and y represents the decoder output.

In some implementations the multiple input modality neural networks 102a-c may include image input modality neural networks. An image input modality network is a neural network that is configured to deepen a received input image feature depth using one or more convolutional layers and optionally skip connections, residual connections, or both. For example, an input image's feature depth may be gradually deepened using residual convolutional modules ConvRes defined as $$c1(x,F) = \text{ConvStep}_{f=F}(W^{3\times3}, x)$$

$$c2(x,F) = \text{ConvStep}_{f=F}(W^{3\times3}, c1(x,F))$$

$$p1(x,F) = \text{MaxPool}_2([3\times3], c2(x,F))$$

$$\text{ConvRes}(x,F) = p1(x,F) + \text{ConvStep}_{s=2}(W^{1\times1}, x),$$

where $\text{MaxPool}_s([h\times x], x)$ represents a max pooling layer over x with stride s and window shape $[h\times x]$. An example image input modality neural network may then be summarized as $$h1(x) = \text{ConvStep}_{a=2, f=32}(W^{3\times3}, x)$$

$$h2(x) = \text{ConvStep}_{f=\Gamma}(W^{3\times3}, h1(x,F))$$

$$r1(x) = \text{ConvRes}(h2)(x), 128)$$

$$r2(x) = \text{ConvRes}(r1)(x), 256)$$

$$\text{ImageModality}_{in}(x) = \text{ConvRes}(r2(x), d),$$

In some implementations the multiple output modality networks 108a-c may include categorical output modality neural networks. A categorical output modality network is a neural network that is configured to reshape a one-dimensional decoder neural network output into a two-dimensional output and perform progressive down sampling on the two-dimensional output. For example, a categorical output modality network may be summarized as $$\text{skip}(x) = \text{ConvStep}_{a=2}(W_{skip}^{3\times3}, x)$$

$$h1(x) = \text{ConvStep}(W_{h1}^{3\times3}, x)$$

$$h2(x) = \text{ConvStep}(W_{h2}^{3\times3}, h1(x))$$

$$h3(x) = \text{skip}(x) + \text{MaxPool}_2([3\times3], h2(x))$$

$$h4(x) = \text{ConvStep}_{f=1536}(W_{hr}^{3\times3}, h3(x))$$

$$h5(x) = \text{ConvStep}_{f=2048}(W^{3\times3}, h4(x))$$

$$h6(x) = \text{FlobalAvgPool}(\text{ReLU}(h5(x)))$$

$$\text{CategoricalModality}_{out}(x) = \text{PointwiseConv}(W^{classes}, h6(x))$$

where GlobalAvgPool represents a mean taken across all spatial and temporal dimensions.

In some implementations the multiple input modality neural networks 102a-c and output modality neural networks 108a-c may include audio modality networks. For example, the modality neural networks 102a-c or 108a-c may include neural networks that receive audio inputs in the form of a 1-dimensional waveform over time (or as a 2-dimensional spectrogram) and include a stack of the ConvRes blocks described with reference to the image input modality neural network, e.g., where an ith block has the form $l_i = \text{ConvRes}(l_{i-1}, 2^i)$. In this example, the spectral modality does not perform any striding along the frequency bin dimension, preserving full resolution in the spectral domain.

The multi task multi modal machine learning model 100 can be trained to perform different machine learning tasks from different machine learning domains or modalities using training data. The multi task multi modal machine learning model 100 can be trained jointly to perform different machine learning tasks from different machine learning domains, so that the multi task multi modal machine learning model 100 simultaneously learns multiple machine learning tasks from different machine learning domains. The training data may include multiple labeled training examples from different corpora, e.g., labeled training examples from a speech corpus, an image database, parsing dataset, or translation corpuses. The training data may be used to adjust the input modality neural networks 102a-c, encoder neural network 104, decoder neural network 106, and output modality neural networks 108a-c weights from initial values to trained values, e.g., by processing the training examples and adjusting the neural network weights to minimize a corresponding loss function.

Once the multi task multi modal machine learning model 100 has been trained, the multi task multi modal machine learning model 100 can be used to perform multiple inferential machine learning tasks from the different machine learning domains. As one of many possible examples, a user device may send data (i) representing an input text segment in an input natural language, and (ii) indicating a target language to the multi task multi modal machine learning model 100 over a network. The multi task multi modal machine learning model 100 may process the received data and provide data representing a translation of the input text segment in the target natural language to the user device. The translation can then be displayed, added to a document, submitted to an application, or otherwise used by the user device.

Figure 2:
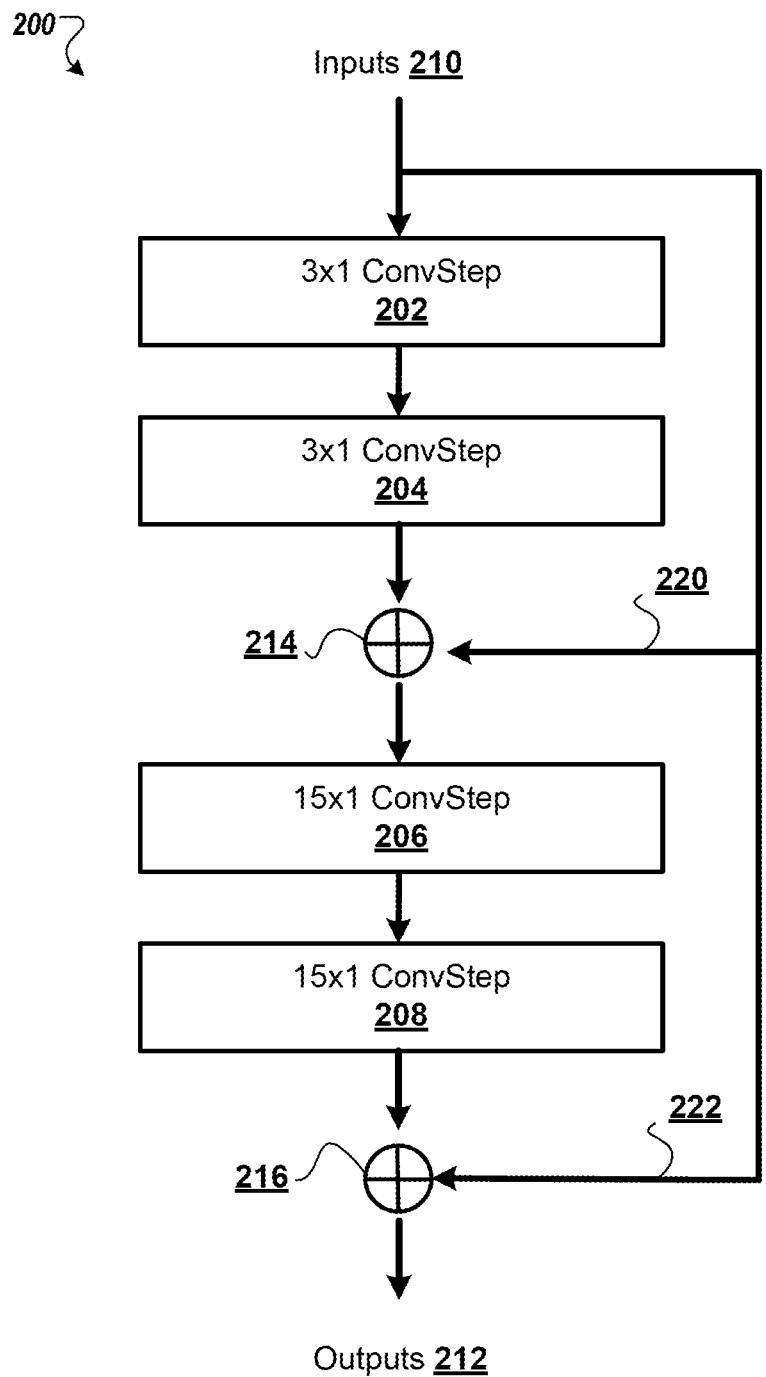
FIG. 2 is a block diagram of an example convolutional module.

FIG. 2 is a block diagram of an example convolutional module 200, as introduced above with reference to FIG. 1. The example convolutional module 200 is an example of a system implemented as computer programs on one or more computers in one or more locations, in which the systems, components, and techniques described below, can be implemented.

The example convolutional module 200 includes a stack of four depth wise separable convolutional neural network layers 202-208 that each perform the convolutional operation ConvStep defined in Equation (1) above. The first two depth wise separable convolutional neural network layers 202 and 204 include 3×1 kernels. The last two depth wise separable convolutional neural network layers 206 and 208 include 15×1 kernels. The final depth wise separable convolutional neural network layer 208 may include a dilation, e.g., by 8, to provide a wide receptive field.

The stack of depth wise separable convolutional neural network layers includes two skip-connections 220, 222 between the stack input 210 and the outputs of (i) the second convolutional step 204 and (ii) the fourth convolutional step 208. The stack of depth wise separable convolutional neural network layers also includes two residual connections 214 and 216. In some cases during training a dropout operation can also be added at the end of the convolutional module 200, e.g., a 50% dropout. After training, the dropout operation can be removed. The operations performed by each of the four depth wise separable convolutional neural network layers 202-208 and the convolutional module 200 as a whole can be described as $$\text{hidden1}(x) = \text{ConvStep}_{1,1}(W_{h1}^{3\times 1}, x) \quad (3)$$

$$\text{hidden2}(x) = x + \text{ConvStep}_{1,1}(W_{h2}^{3\times 1}, \text{hidden1}(x))$$

$$\text{hidden3}(x) = \text{ConvStep}_{1,1}(W_{h3}^{15\times 1}, \text{hidden2}(x))$$

$$\text{hidden4}(x) = x + \text{ConvStep}_{8,1}(W_{h4}^{15\times 1}, \text{hidden3}(x))$$

$$\text{ConvModule}(x) = \begin{cases} \text{Dropout}(\text{hidden4}(x), 0.5) & \text{during training} \\ \text{hidden4}(x) & \text{otherwise} \end{cases}$$

where $W_p^i$ represents the parameters of each separable convolution and ConvStep is defined in Equation (2) above.

Figure 3:
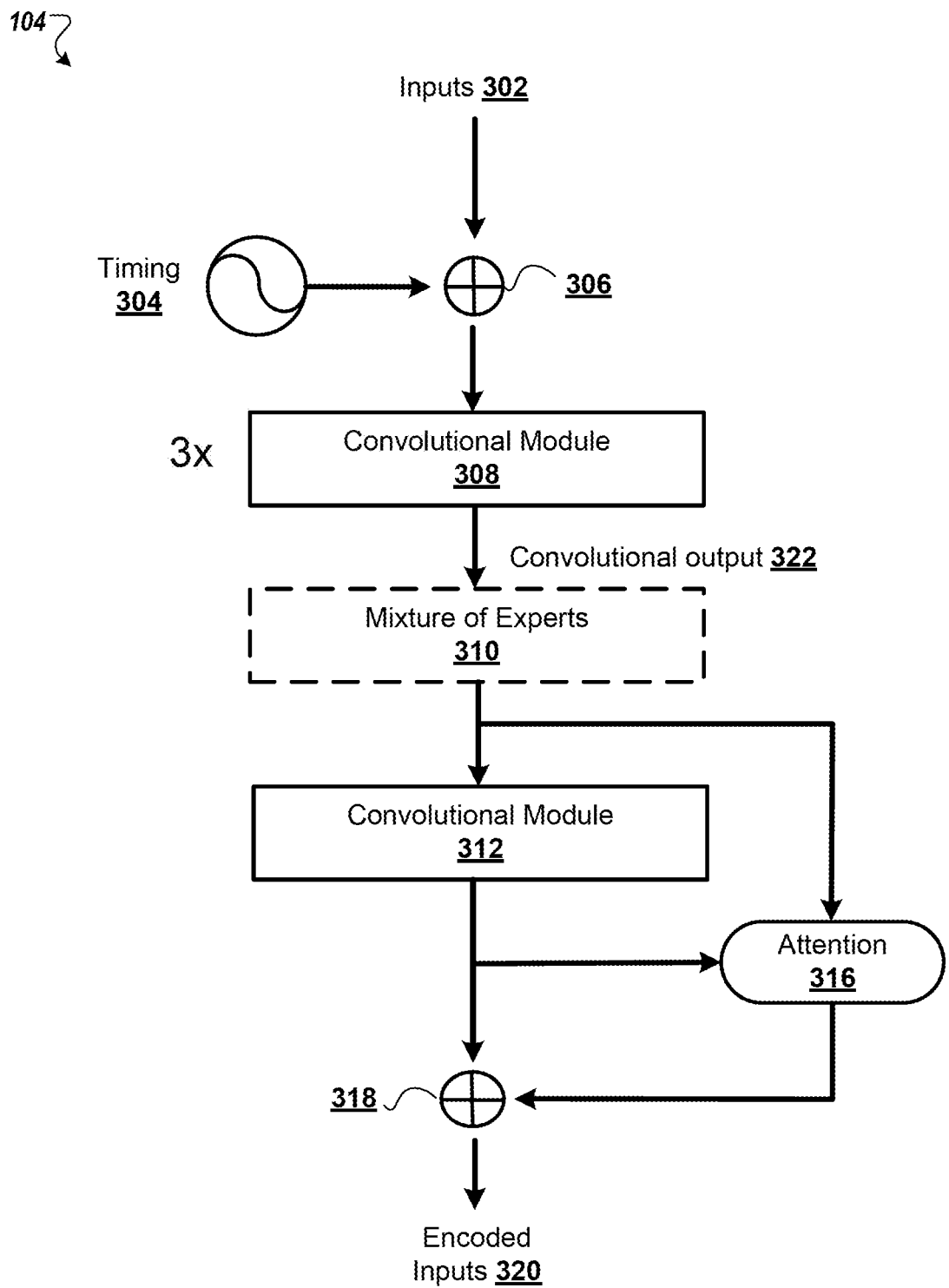
FIG. 3 is a block diagram of an example input encoder neural network.

FIG. 3 is a block diagram of an example encoder neural network 104, as introduced above with reference to FIG. 1. The example encoder neural network 104 is an example of a system implemented as computer programs on one or more computers in one or more location's, in which the systems, components, and techniques described below, can be implemented.

The example encoder neural network 104 includes a residual connection 306 between the data input 302 and a timing signal 304. After the timing signal 304 has been added to the input 302, the combined input is provided to the convolutional module 308 for processing. The convolutional module 308 includes multiple convolutional neural network layers, e.g., depth wise separable convolutional neural network layers, as described above with reference to FIGS. 1 and 2. The convolutional module 308 generates as output a convolutional output, e.g., convolutional output 322.

Optionally, the encoder neural network 104 may include a sparsely-gated mixture of experts neural network layer 310. A mixture of experts neural network layer includes a number of feed-forward neural networks (experts) and a trainable gating network which selects a sparse combination of the experts to process each input. Mixture of experts neural network layers are described in "*Outrageously large neural networks: The sparsely-gated mixture-of-experts Layer,*" Maziarz et al., arXiv preprint 1701.06538, 2017.

Outputs from the mixture of experts layer 310 can be provided to a second convolutional module 312 (which may be similar to the convolutional module 200 described with reference to FIG. 2) and an attention neural network layer 316 for processing. The attention neural network layer 316 processes the outputs from the mixture of experts layer 310 and outputs from the second convolutional module 312. A second residual connection 318 adds the outputs from the second convolutional module 312 and the attention neural network layer 316 to generate an encoded input 320.

Figure 4:
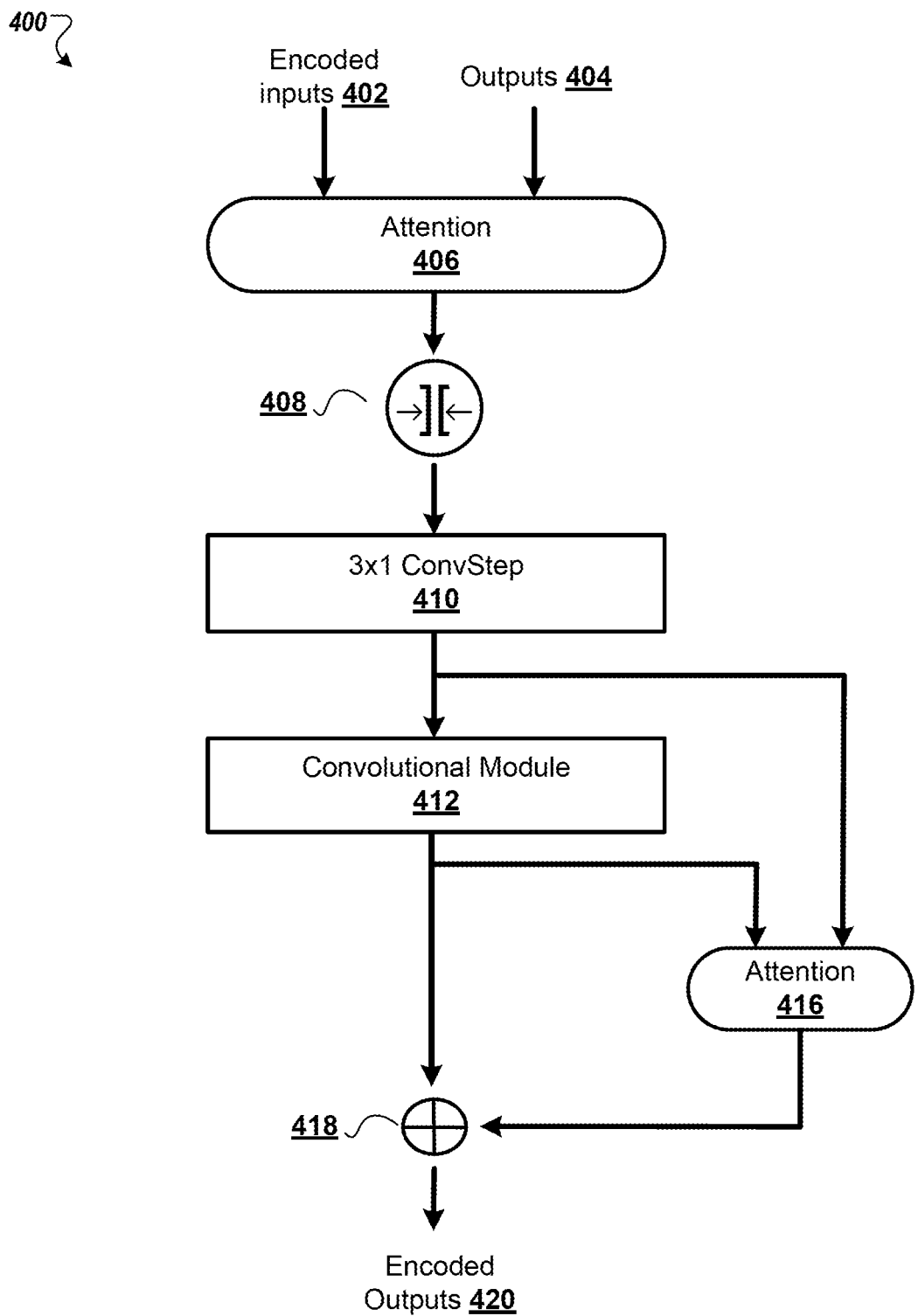
FIG. 4 is a block diagram of an example input/output mixer neural network.

FIG. 4 is a block diagram of an example input/output mixer neural network 400. The example input/output mixer neural network 400 is an example of a system implemented as computer programs on one or more computers in one or more locations, in which the systems, components, and techniques described below, can be implemented.

The example input/output mixer neural network 400 includes an attention neural network layer 406 that receives encoded inputs 402 from the encoder neural network 104 described above with reference to FIGS. 1 and 3, and receives outputs 404 generated by the decoder neural network 106 described above and below with reference to FIGS. 1 and 5. The input/output mixer neural network 400 concatenates 408 the output of the attention neural network layer 406 and the outputs 404. The concatenated outputs are then processed using a convolutional layer 410 of multiple depth wise separable convolutional neural network layers, as described above with reference to FIGS. 1 and 2. The outputs of the convolutional layer 410 are provided to a second attention neural network layer 416 and to a convolutional module 412. The convolutional module 412 (which may be similar to the convolutional module 200 described with reference to FIG. 2) processes received outputs of the convolutional layer 410 and provides the processed outputs to a residual connection 418. The attention neural network layer 416 processes outputs of the convolutional layer 410 and outputs of the convolutional module 412 and provides the processed outputs to the residual connection 418. The residual connection 416 then generates encoded outputs 420. The encoded outputs 420 may then be passed to the decoder neural network 106.

Figure 5:
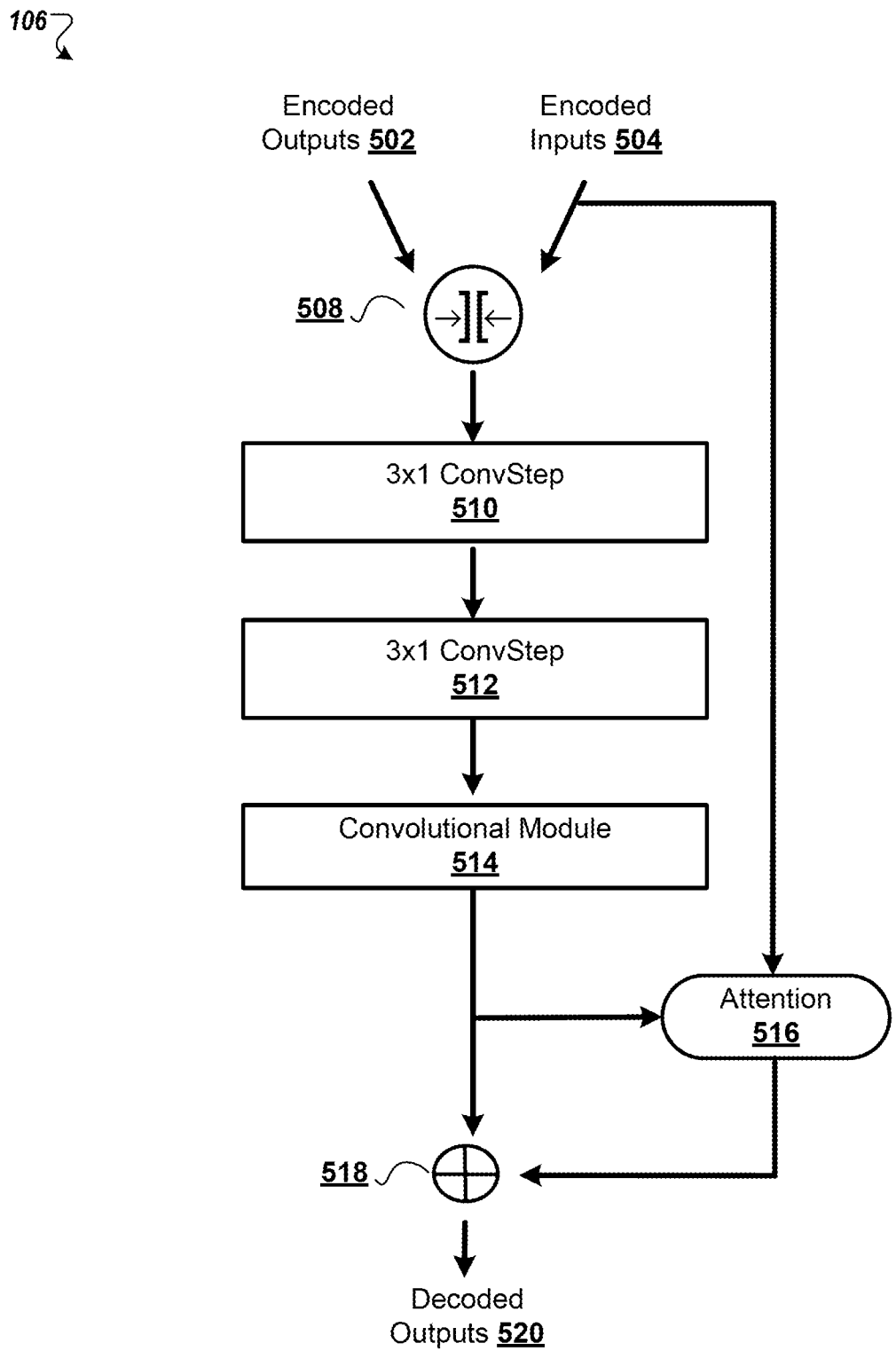
FIG. 5 is a block diagram of an example decoder neural network.

FIG. 5 is a block diagram of an example decoder neural network 106, as introduced above with reference to FIG. 1. The example decoder neural network 106 is an example of a system implemented as computer programs on one or more computers in one or more locations, in which the systems, components, and techniques described below, can be implemented.

The example decoder neural network 106 concatenates 508 encoded inputs 504, e.g., received from the encoder neural network 104, and encoded outputs 503, e.g., received from the input output mixer neural network 400. The example decoder neural network 106 provides the concatenated inputs and outputs to a stack of convolutional neural network layers 510, 512 and convolutional module 514. The convolutional neural network layers 510, 512 and convolutional module 514 may be similar to those described with reference to FIG. 2. An attention neural network layer 516 processes the output of the convolutional module 514 and the encoded inputs 504. A residual connection 518 combines the output of the convolutional module 514 and the attention neural network layer 516 to generate decoded output 520.

Figure 6:
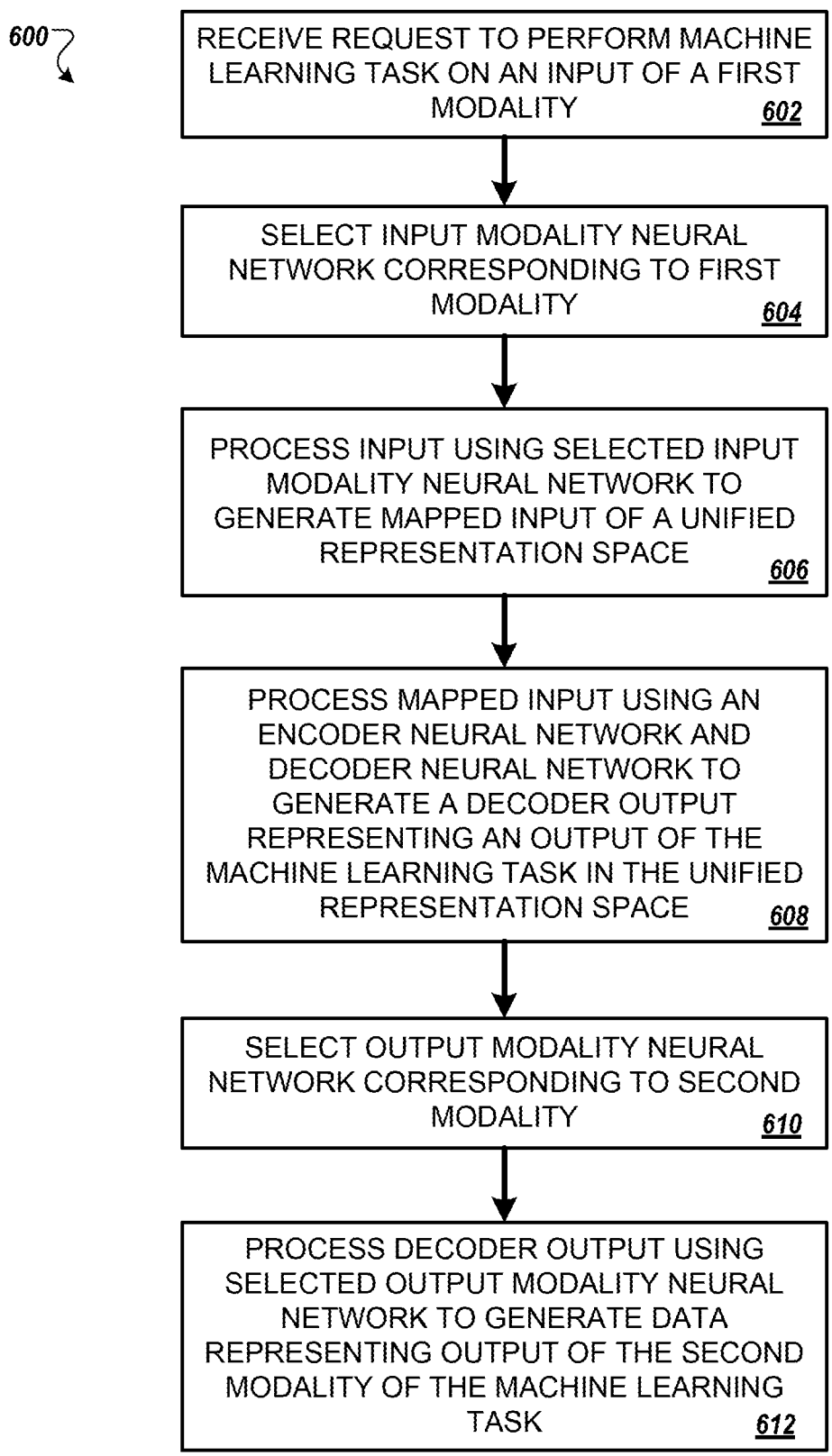
FIG. 6 is a flow diagram of an example process for performing a machine learning task on an input of a first modality.

FIG. 6 is a flow diagram of an example process for performing a machine learning task on an input of a first modality. For convenience, the process 600 will be described as being performed by a system of one or more computers located in one or more locations. For example, a multi task multi modal machine learning model, e.g., the model 100 of FIG. 1, can perform the process 600.

The system receives a request to perform a machine learning task on an input of a first modality (step 602). The machine learning task is a machine learning task from a particular machine learning domain that transforms inputs of the first modality to outputs of a second modality. For example, the system may receive a request to perform a machine translation of an input text segment in an input natural language to a corresponding text segment in a target natural language. In this example, the first modality is the input natural language and the second modality is the target natural language. As another example, the system may receive a request to categorize an input image. In this example, the first modality is the image and the second modality is the categorization. As another example, the system may receive a request to perform speech recognition on an audio sequence representing a spoken utterance in an input natural language.

The system selects an input modality neural network that corresponds to the first modality from multiple input modality neural networks (step 604). The selected input modality neural network is configured to map data inputs of the first modality to mapped data inputs of a unified representation space, as described above with reference to FIG. 1.

The system processes the input of the first modality using the selected input modality neural network to generate a mapped input of the unified representation space (step 606). The unified representation is variable-size.

The system processes the mapped input of the unified representation space using an encoder neural network and a decoder neural network to generate a decoder output (step 608). The decoder output represents a representation of an output of the machine learning task in the unified representation space.

The system selects an output modality neural network that corresponds to a second modality from multiple output modality neural networks (step 610). The selected output modality neural network is configured to map decoder outputs of the unified representation space to mapped data outputs of the second modality.

The system processes the decoder output using the selected output modality neural network to generate data representing an output of the second modality of the machine learning task (step 612).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g. an HTML page, to a user device, e.g. for purposes of displaying data to and receiving user input from a user interacting with the user device, which acts as a client. Data generated at the user device, e.g. as a result of the user interaction, can be received from the user device at the server.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices storing instructions that when executed by the one or more computers cause the one or more computers to implement:
   a machine learning model that comprises:
      a plurality of input modality neural networks, wherein each input modality neural network corresponds to a different modality of multiple modalities and is configured to map received data inputs of the corresponding modality to mapped data inputs from a variable-sized unified representation space, wherein data inputs of multiple different modalities are mapped to the same variable-sized unified representation space, and wherein the received data inputs of different modalities have different sizes and dimensions and wherein the mapped data inputs for the received data inputs of the different modalities from the variable-sized unified representation space vary in size;
      an encoder neural network that is configured to process mapped data inputs from the unified representation space to generate respective encoder data outputs;
      a decoder neural network that is configured to process encoder data outputs to generate respective decoder data outputs from the unified representation space; and
      a plurality of multiple output modality neural networks, wherein each output modality neural network corresponds to a different modality and is configured to map decoder data outputs from the unified representation space that correspond to received data inputs of the corresponding modality to data outputs of the corresponding modality.

2. The system of claim 1, wherein the multiple modalities comprise one or more of (i) image recognition, (ii) speech recognition, (iii) translation, (iv) image captioning, or (v) parsing.

3. The system of claim 1, wherein the plurality of input modality networks comprise neural networks corresponding to different modalities, and wherein the plurality of output modality networks comprise neural networks corresponding to different modalities.

4. The system of claim 3, wherein the plurality of input modality networks and plurality of output modality networks modalities comprise (i) language modality networks, (ii) image modality networks, (iii) audio modality networks, and (iv) categorical data modality networks.

5. The system of claim 4, wherein a language output modality network is configured to:
   receive as input a decoder output from the decoder neural network;
   perform a learned linear mapping followed by a softmax activation function to generate a probability distribution over the token vocabulary.

6. The system of claim 4, wherein an image input modality network is configured to deepen a received input image feature depth using one or more residual convolutional layers.

7. The system of claim 4, wherein a categorical output modality network is configured to reshape a one-dimensional decoder neural network output into a two-dimensional output and perform progressive down sampling on the two-dimensional output.

8. The system of claim 1, wherein the plurality of input modality networks comprise a language input modality network that is configured to:
  receive as input a sequence of tokens from a token vocabulary, optionally wherein the received sequence of tokens ends with a termination token; and
  map the sequence of tokens to a predetermined dimensionality, the predetermined dimensionality dependent on a dimension of the encoder and decoder neural networks.

9. The system of claim 1, wherein the decoder neural network is an autoregressive decoder neural network.

10. The system of claim 1, wherein the encoder neural network and decoder neural network comprise neural network components from multiple machine learning domains, comprising (i) one or more convolutional neural network layers, (ii) one or more attention neural network layers configured to perform respective attention mechanisms, and (iii) one or more sparsely gated neural network layers.

11. The system of claim 10, wherein each convolutional neural network layer is configured to receive as input a tensor of shape [batch size, sequence length, 1, feature channels] and to return a tensor of the same shape.

12. The system of claim 10, wherein each convolutional neural network layer comprises rectified linear unit nonlinearities and layer normalization.

13. The system of claim 10, wherein the one or more convolutional neural network layers are configured to perform convolutional operations, comprising performing depthwise separable convolutions.

14. The system of claim 13, wherein a convolutional operation is defined as $$\text{ConvStep}_{d,s}(W, x) = \text{LN}(\text{StepConv}_{d,s}(W, \text{ReLU}(x)))$$

where W represents convolutional layer weights, x represents convolutional layer input tensor, LN represents convolutional layer normalization and ReLU represents rectified linear unit non linearities.

15. The system of claim 10, wherein the one or more convolutional neural network layers comprise a stack of four convolutional layers with two skip connections between the stack input and outputs of the second and fourth convolutional layers.

16. The system of claim 10, wherein each attention neural network layer comprises one or more convolutional neural network layers that include one or more pointwise convolutional neural network layers.

17. The system of claim 16, wherein each attention neural network layer is configured to:
  additively compose the target tensor with a timing signal and mix the target tensor using one or more of the convolutional layers to generate a mixed tensor;
  self-attend the mixed tensor to generate query keys;
  generate memory keys and memory values by passing the source tensor through one or more pointwise convolutional layers; and
  use the generated query keys, memory keys and memory values to apply an attention mechanism between the self-attended target input tensor and the source input tensor.

18. The system of claim 10, wherein each attention neural network layer is configured to receive as input (i) a source input tensor, and (ii) a target input tensor, the source input tensor and target input tensor having the shape [sequence length, feature channels].

19. A computer implemented method comprising:
  receiving a request to perform a machine learning task on an input of a first modality of a plurality of modalities, wherein the machine learning task comprises a machine learning task from a particular machine learning domain that transforms inputs of the first modality to outputs of a second modality of the plurality of modalities;
  selecting an input modality neural network that corresponds to the first modality from a plurality of input modality neural networks, wherein the selected input modality neural network is configured to map data inputs of the first modality to mapped data inputs of a variable-sized unified representation space, wherein data inputs of multiple different modalities are mapped to the same variable-sized unified representation space, and wherein data inputs of different modalities have different sizes and dimensions and wherein the mapped data inputs for the data inputs of the different modalities from the variable-sized unified representation space vary in size;
  processing the input of the first modality using the selected input modality neural network to generate a mapped input of the unified representation space;
  processing the mapped input of the unified representation space using an encoder neural network and a decoder neural network to generate a decoder output, the decoder output representing a representation of an output of the machine learning task in the unified representation space;
  selecting an output modality neural network that corresponds to a second modality from a plurality of output modality neural networks, wherein the selected output modality neural network is configured to map decoder outputs of the unified representation space to mapped data outputs of the second modality; and
  processing the decoder output using the selected output modality neural network to generate data representing an output of the second modality of the machine learning task.

20. One or more non-transitory computer-readable storage media encoded with instructions that, when executed by one or more computers, cause the one or more computers to perform operations comprising:
  receiving a request to perform a machine learning task on an input of a first modality of a plurality of modalities, wherein the machine learning task comprises a machine learning task from a particular machine learning domain that transforms inputs of the first modality to outputs of a second modality of the plurality of modalities;
  selecting an input modality neural network that corresponds to the first modality from a plurality of input modality neural networks, wherein the selected input modality neural network is configured to map data inputs of the first modality to mapped data inputs of a variable-sized unified representation space, wherein data inputs of multiple different modalities are mapped to the same variable-sized unified representation space, and wherein data inputs of different modalities have different sizes and dimensions and wherein the mapped data inputs for the data inputs of the different modalities from the variable-sized unified representation space vary in size;
  processing the input of the first modality using the selected input modality neural network to generate a mapped input of the unified representation space;

processing the mapped input of the unified representation space using an encoder neural network and a decoder neural network to generate a decoder output, the decoder output representing a representation of an output of the machine learning task in the unified representation space;

selecting an output modality neural network that corresponds to a second modality from a plurality of output modality neural networks, wherein the selected output modality neural network is configured to map decoder outputs of the unified representation space to mapped data outputs of the second modality; and processing the decoder output using the selected output modality neural network to generate data representing an output of the second modality of the machine learning task.

* * * * *